US012791697B2

(12) United States Patent
Braun et al.

(10) Patent No.: US 12,791,697 B2
(45) Date of Patent: Nov. 10, 2026

(54) DETERMINING THE RADIAL VELOCITY OF OBJECTS IN VEHICLE ENVIRONMENTS

(71) Applicant: Aptiv Technologies AG, Schaffhausen (CH)

(72) Inventors: Marco Braun, Düsseldorf (DE); Adrian Becker, Düsseldorf (DE); Simon Roesler, Neuss (DE); Mirko Meuter, Erkrath (DE)

(73) Assignee: Aptiv Technologies AG, Schaffhausen (CH)

( * ) Notice: Subject to any disclaimer, the term of this patent is extended or adjusted under 35 U.S.C. 154(b) by 215 days.

(21) Appl. No.: 18/541,178

(22) Filed: Dec. 15, 2023

(65) Prior Publication Data

US 2024/0201359 A1 Jun. 20, 2024

(30) Foreign Application Priority Data

Dec. 16, 2022 (EP) .................................... 22214124

(51) Int. Cl.
*G01S 13/58* (2006.01)
*G01S 7/41* (2006.01)
*G01S 13/931* (2020.01)

(52) U.S. Cl.
CPC ............ *G01S 13/589* (2013.01); *G01S 7/412* (2013.01); *G01S 7/417* (2013.01); *G01S 7/418* (2013.01);

(Continued)

(58) Field of Classification Search
CPC .......... G01S 7/412; G01S 7/417; G01S 7/418; G01S 13/583; G01S 13/585; G01S 13/589; G01S 2013/9314

(Continued)

(56) References Cited

U.S. PATENT DOCUMENTS 5,157,403 A * 10/1992 Urkowitz .............. G01S 7/2927 342/111
6,204,804 B1 * 3/2001 Andersson .............. G01S 13/87 342/60

(Continued)

OTHER PUBLICATIONS

Extended European Search Report regarding European Patent Application No. 22214124.4, dated Jun. 14, 2023.

(Continued)

*Primary Examiner* — Brady W Frazier

(74) *Attorney, Agent, or Firm* — Harness, Dickey & Pierce, P.L.C.

(57) ABSTRACT

The present disclosure relates to a computer-implemented method for determining a radial velocity of an object in a surrounding of a vehicle, the method comprising the steps of: obtaining measurement data from a radar, the measurement data comprising signal data indicative of a measured radial velocity of the object, mapping the measured radial velocity of the object to a plurality of radial velocity intervals, determining, using an artificial intelligence (AI) engine, a probability value for each interval of the plurality of radial velocity intervals based on supplemental measurement data, and determining the radial velocity of the object by selecting an interval of the plurality of radial velocity intervals based on the probability value. The disclosure further relates to a corresponding apparatus, computer program and vehicle.

11 Claims, 8 Drawing Sheets

(52) U.S. Cl.
CPC .......... *G01S 13/583* (2013.01); *G01S 13/585* (2013.01); *G01S 2013/9314* (2013.01)

(58) Field of Classification Search
USPC .......................................................... 342/115
See application file for complete search history.

(56) References Cited

U.S. PATENT DOCUMENTS

| | | | | |
|---|---|---|---|---|
| 6,982,668 | B1 * | 1/2006 | Doerry | G01S 13/5242 342/162 |
| 10,866,304 | B1 * | 12/2020 | Hassibi | G01S 13/26 |
| 2019/0107614 | A1 * | 4/2019 | Dobrev | G01S 13/34 |
| 2021/0018594 | A1 * | 1/2021 | Kipp | G01S 7/4052 |
| 2022/0196798 | A1 * | 6/2022 | Chen | G01S 7/354 |
| 2022/0283288 | A1 * | 9/2022 | Yu | G01S 13/42 |
| 2023/0213640 | A1 * | 7/2023 | Kuroda | G01S 13/44 342/28 |
| 2023/0333236 | A1 * | 10/2023 | O'Connor | G01S 7/2955 |
| 2024/0004027 | A1 * | 1/2024 | Tapia | G01S 7/497 |

OTHER PUBLICATIONS

"Simple Statistical Gradient-Following Algorithms for Connectionist Reinforcement Learning," Ronald J. Williams, College of Computer Science, Machine Learning, 8, pp. 229-256, 1992.
"Vehicle Detection With Automotive Radar Using Deep Learning on Range-Azimuth-Doppler Tensors," Bence Major, et al., Qualcomm AI Research, Qualcomm Technologies, Inc. (2019).
MotionNet: Joint Perception and Motion Prediction for Autonomous Driving Based on Bird's Eye View Maps., Pengxiang Wu, et al., Mar. 15, 2020.
"Motion Estimation in Occupancy Grid Maps in Stationary Settings Using Recurrent Neural Networks," Marcel Schreiber, et al., May 5, 2022.

* cited by examiner

R: Num. Range Bins
A: Num. Angle Bins
D: Num. Doppler Bins
F: Num. Feature Encodings
V: Num. Velocity Scalars
X: Num. Grid Bins x-Direction
Y: Num Grid Bins y-Direction
L: Loss function

DETERMINING THE RADIAL VELOCITY OF OBJECTS IN VEHICLE ENVIRONMENTS

CROSS-REFERENCE TO RELATED APPLICATIONS

This application claims the benefit and priority of European patent application number 22214124.4, filed on Dec. 16, 2022. The entire disclosure of the above application is incorporated herein by reference.

FIELD

The present disclosure relates to a computer-implemented method, an apparatus, an apparatus an apparatus in a vehicle, and a computer program for determining a radial velocity of an object in a surrounding of a vehicle.

BACKGROUND

This section provides background information related to the present disclosure which is not necessarily prior art.

Nowadays, vehicles (cars, ships, robots etc.) are oftentimes operated using vehicle assistance systems (e.g., such as an Advanced Driving Assistance Systems (ADAS)) to provide some degree of driving assistance to the driver. Additionally, the vehicle assistant system may also be able to control a vehicle semi-autonomously or even fully autonomously. This requires that the vehicle assistant system has sufficient knowledge of its surroundings, in particular of obstacles such as other vehicles, pedestrians etc. to avoid collisions and allowing the vehicle to navigate safely through its surrounding environment. Oftentimes radars are used to obtain the required data to determine objects, to estimate their velocities or to classify the surrounding in the environment of a vehicle.

Since radars or radar sensors are relatively inexpensive, have a long range and are less weather dependent than other sensors, using radar sensors has seen a growth in popularity. One commonly used type of radar is a FMCW radar.

In FMCW radar signal processing, targets are assumed to be peaks in so-called Range-Doppler-Maps determined from the returned echoes of the transmitted radar waves, where every map location corresponds to a particular range r and velocity $v_r$ of the target. Determining the incident angle $\alpha$ of the impinging wave leads to so called detections (comprising range, angle, radial velocity and amplitude of the target). As this radial velocity is obtained from a Fast Fourier transformation (FFT) to measure the phase shift of the intermediate signal across N FMCW chirps, measuring capabilities are limited by restrictions imposed by the sampling theorem.

In general, any FFT utilized to extract frequency components of time-discrete signals is determined by a maximum resolution and a maximum sampling frequency:

1. The minimum change in frequency that can still be resolved is determined by the ratio of the sampling frequency $f_{sample}$ and the amount of sampling locations per measuring window, and
2. the maximum unambiguous frequency is determined according to the Nyquist-Shannon sampling theorem. That is, if a function contains no frequencies higher than W, it is completely determined by giving its ordinates at a series of points spaced 1/(2W) seconds apart, which means that a sampling rate of at least 2W is required to extract maximum frequencies of W from the signal.

When designing a radar system, both the maximum resolvable frequency as well as the maximum unambiguous frequency interval are determined by system parameters, like the carrier frequency $f_c$ and the chirp duration $T_c$. While ambiguities of measured Doppler velocities potentially pose a higher overall challenge to radar applications, simple modifications of these system parameters to increase the unambiguous Doppler interval also affect the resolution of Doppler measurements. Therefore, both restrictions must always be considered simultaneously when one of them is adjusted.

As defined above, the maximum resolvable frequency of a signal is determined by the ratio of $f_{sample}$ and the amount of sampling locations of the FFT. The radial velocity $v_r$ is determined by measuring the change in phase $\Delta\varphi_{IF}$ across N consecutive chirps. With a chirp length of $T_c$, the sampling frequency is therefore defined as $f_{sample}=1/T_c$ leading to a Doppler frequency with a maximum resolution restricted by $$f_r > \frac{1}{T_c N}$$

which leads to the maximum resolvable velocity given by $$\Delta v_r > \frac{c}{2 f_c T_c N}.$$

Moreover, half the sampling rate $f_{sample}$ determines the maximum unambiguous frequency that can be extracted by the FFT while not violating the Nyquist-Shannon theorem. Thus, the frequency of phase shift across N chirps indicating the velocity of underlying objects $f_v$ is restricted by $$2 f_v < \frac{1}{T_c}$$

which leads to the maximum unambiguous velocity given by $$v_r^{max} < \frac{c}{4 f_c T_c}.$$

These equations describe the aforementioned trade-offs between velocity resolution and maximum unambiguous velocity intervals considering different parameters for $f_c$ and $T_c$. While increasing both $f_c$ and $T_c$ increases the velocity resolution defined in the second equation, it decreases the unambiguous velocity range denoted in the fourth equation. Analogously, decreasing $f_c$ and $T_c$ leads to the opposite effect. For this reason, it is not possible to optimize the overall performance of a radar system by simply tuning these system parameters.

Ambiguities of measured Doppler velocities dramatically reduce the reliability of a system due to potentially high discrepancies between measured and actual radial velocities.

In the prior art, Deep Learning-based approaches have been presented predicting the dynamics of objects around the vehicle using radar data. For example, in Bence Major et al.: "Vehicle Detection with Automotive Radar Using Deep Learning" velocities of objects are assigned to bounding boxes to predict the absolute velocity of objects. While this approach provides a way to determine the velocity of an object based on radar data, the estimate of the absolute velocity is not very precise.

Against this background, an object of the present invention is to provide a method for improving the radar-based determination of the radial velocity of objects in the environment of a vehicle.

SUMMARY

This section provides a general summary of the disclosure, and is not a comprehensive disclosure of its full scope or all of its features.

The above-mentioned problem is at least partly solved by a computer-implemented method according to claim 1, by an apparatus according to claim 9, by a computer program according to claim 10, and by a vehicle according to claim 11.

In an aspect, the present invention concerns a computer-implemented method for determining a radial velocity of an object in a surrounding of a vehicle. Measurement data may be obtained from a radar, wherein the measurement data may comprise signal data indicative of a measured radial velocity of the object. The method may further comprise the step of mapping the measured radial velocity of the object to a plurality of radial velocity intervals. Furthermore, the method may comprise the step of determining, using an artificial intelligence (AI) engine, preferably using a deep learning model, a probability value for each interval of the plurality of radial velocity intervals based on supplemental measurement data. The method may further comprise the step of determining the radial velocity of the object by selecting an interval of the plurality of radial velocity intervals based on the probability value.

With the above it is possible to determine a radial velocity of an object more precisely by using, for example, a measured Doppler velocity with a reduced risk of any potential ambiguities inherent to particular radar systems.

In a further aspect, determining the probability value is based on one or more of the following values, preferably included in the supplemental measurement data: reflection angle data associated with the object, environmental context data, and/or the signal data indicative of a measured radial velocity of the object.

With the above, the probability value assigned to each interval of the plurality of radial velocity intervals can be determined. For example, the reflection angle associated with an object may indicate whether an object is likely on the opposite lane of a road, or whether it is driving in the same direction/on the same lane as the vehicle does, which carries out the method according to the present disclosure. The environmental context data may, for example, indicate whether the environment is a highway environment, or a residential area environment. Based on one or more of these two determinations and on the measured radial velocity, the probability values can be assigned to the individual intervals of the plurality of radial velocity intervals.

In a further aspect, selecting the interval further comprises estimating a velocity value of the object based on supplemental measurement data, preferably included in the measurement data; and considering the estimated velocity value for estimating the probability value assigned to each interval of the plurality of radial velocity intervals. Preferably, the supplemental measurement can be obtained directly from the measurement data or indirectly form the measurement data, i.e., determined based on the measurement data.

With the above, an estimated velocity of the object can be determined by considering other aspects of the radar data and the environment of the vehicle/object. For example, a velocity value may be estimated or determined, e.g., by an AI system. This velocity value may then be used to define a probability value for each interval. Then, the interval with the highest probability value may be selected as the one to include the actual radial velocity of the object. By considering an estimated radial velocity for determining the actual radial velocity of the object based on the measured radial velocity of the object, large discrepancies of ambiguous measured radial velocities may be avoided.

In a further aspect, the radial velocity of the object is determined by selecting the interval of the plurality of radial velocity intervals having the highest probability value.

By selecting the interval of the plurality of radial velocity intervals having the highest probability value for determining the radial velocity of the object, the prediction/determination is made more reliable.

In a further aspect, determining further comprises defining the measured radial velocity mapped to the selected interval as the radial velocity of the object.

In a further aspect, the method further comprises generating the plurality of radial velocity intervals by shifting one unambiguous radial velocity interval to form at least one ambiguous radial velocity interval, wherein each mapped measured radial velocity represents a potential radial velocity of the object.

Mapping a potential measured radial velocity to corresponding intervals facilitates the determination of the actual radial velocity of the object by providing accurate values from which one corresponds to the actual radial velocity of the object.

In another aspect, the method further comprises deriving the probability value assigned to each interval based on a difference between the potential measured radial velocities and the estimated velocity value.

By considering the estimated velocity of the object for the determination of the radial velocity based on the measured radial velocity of the object, large discrepancies between the measured radial velocity and the actual radial velocity of the object are avoided.

In a further aspect, a smallest difference between the potential measured radial velocity and the estimated radial velocity value corresponds to the highest probability value.

By selecting the interval having the highest probability value (smallest difference), the actual radial velocity of the object may be determined precisely.

In another aspect, the intervals are allocated adjacent to each other in the Doppler velocity dimension In a further aspect, the intervals are allocated having a common width in the Doppler velocity dimension, wherein preferably, the common width depends on the characteristics of the radar.

In another aspect, the measurement data, preferably the measured radial velocity of the object, is undersampled.

In a further aspect, the radar is a FMCW radar.

In a further aspect, during the training process of the AI engine, the engine maps input data like feature embeddings of the environmental context data, the reflection angle data and measured radial velocities to the probability values assigned to each interval of the plurality of radial velocity interval.

AI engines are particularly well suited for tasks like determining the probability value for the intervals as well as estimating the radial velocity of the object. By training the AI engine on the environmental context data, the reflection angle data and the measured radial velocities, the probability value can be reliably used to determine the actual radial velocity of the object.

In another aspect, the method further comprises determining an operating instruction for the vehicle based on the determined velocity of the object affecting a function of a vehicle assistance system, wherein the function comprises at least one of: displaying the object and preferably also the velocity of the object on a display of the vehicle; conducting a vehicle path planning; triggering a warning; affecting control of the vehicle during a parking process and/or during driving.

The above allows to assist a user of a vehicle by using the method of determining the radial velocity of the object in the environment of the vehicle. For example, in automatically avoiding objects in a traffic situation based on the determined velocity of the object, warning a user from obstacles that might intercept the course of the vehicle, and/or aiding a user in parking or driving the vehicle.

Another aspect of the invention is directed to an apparatus comprising means configured to perform the above-presented method.

A further aspect of the invention relates to a computer program comprising instructions, which when executed by a computing system, causing the computing system to perform the above-described method.

Yet another aspect of the invention relates to a vehicle comprising an apparatus configured to perform the above-described method.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Various aspects of the present invention are described in more detail in the following by reference to the accompanying figures without the present invention being limited to the embodiments of these figures.

Corresponding reference numerals indicate corresponding parts throughout the several views of the drawings.

DETAILED DESCRIPTION

Example embodiments will now be described more fully with reference to the accompanying drawings.

Figure 1:
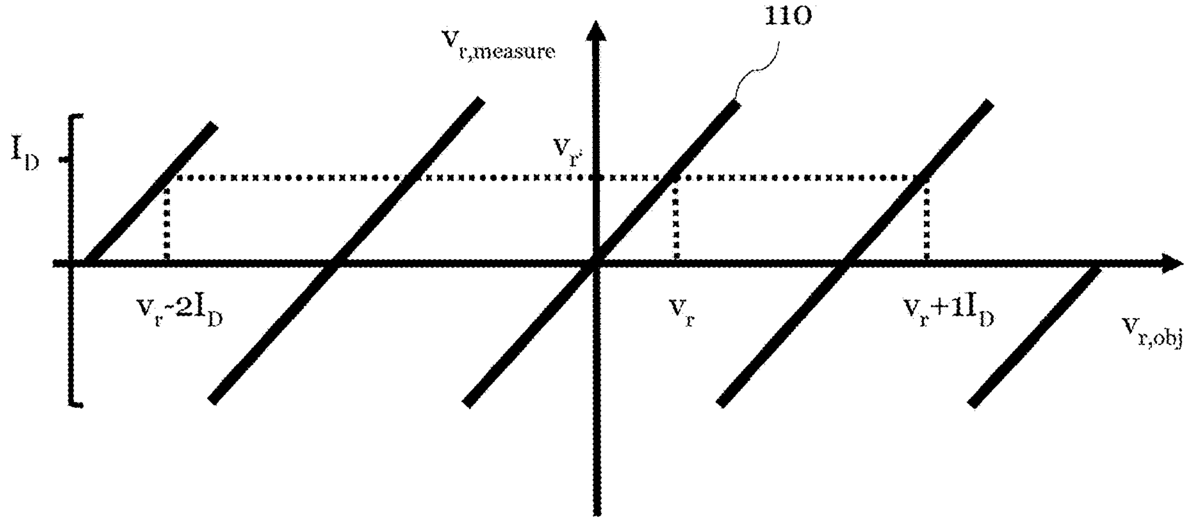
FIG. 1 illustrates potential ambiguities of radial velocity measurements using a radar.

In FIG. 1, the ambiguity of measured radial velocity data is illustrated. Due to the constraints related to the maximum unambiguous velocity and the maximum resolvable velocity, radars in the art are typically configured to unambiguously cover a certain velocity/distance range/interval. An exemplary radar known in the art is a FMCW radar. The FMCW radar typically provides measurement data with Doppler velocity information of an object. An exemplary FMCW radar may have an unambiguous interval of [−30 m/s; 30 m/s] (corresponding to [−108 km/h; 108 km/h]). The velocities provided with the interval are not the total velocities of objects, but radial velocities with respect to the radar or the vehicle on which the radar is mounted. The term "unambiguous interval" means that the radar can reliably detect the actual velocity of the object in this range, wherein velocities outside of this range are not covered reliably. That is, radial velocities of the object measured outside this interval are typically undersampled such that the actual velocity of the object are difficult to obtain in an unambiguous manner. In particular, velocities outside the range violate the Nyquist-Shannon theorem such that reliable velocity information cannot be obtained from the radar data without further processing. In fact, a radar configured with a certain unambiguous interval would always provide a velocity within the range, no matter how fast the object actually is with respect to the radar (radial velocity). For example, a radar having the unambiguous interval of [−82.8 km/h; 37.8 km/h] would be able to reliably determine the radial velocity of an object that is 20 km/h faster than the radar (i.e., the vehicle that carries the radar) itself. However, it would not be able to reliably determine the radial velocity of an object that is 60 km/h faster. In this case, the measurement data from the radar would not feedback the correct radial velocity but a radial velocity from the range of [−82.8 km/h; 37.8 km/h]. In the following, the (maximum) interval of the radar is denoted as $I_D$.

In FIG. 1, the unambiguous interval will be described in more detail. In the plot shown in FIG. 1, the x-axis indicates the actual radial velocity of the object, and the y-axis indicates the corresponding Doppler velocity measurement provided by the radar. It can be seen that the measured radial velocity of the vehicle will only be provided within the range of $I_D$, no matter how fast the object actually is. As already indicated above, this is due to aliasing effects due to violation of the Nyquist-Shannon theorem at high/low velocities outside the unambiguous interval. The central line 110 indicates the unambiguous interval. In this range, any measured radial velocity $v_{r,measure}$ corresponds to the actual radial velocity of the object $v_{r,object}$. However, object radial velocities above the unambiguous interval (lines to the right) are measured at least one interval of $I_D$ below their actual value. For example, an object having a radial velocity of $v_r+1I_D$ would be measured as having a radial velocity of $v_r$. Similarly, object radial velocities below the unambiguous interval are measured at least one interval of $I_D$ above their actual value. For example, an object having a radial velocity of $v_r$-$2I_D$ would also be measured as having a radial velocity of $v_r$.

Disambiguating Module

Figure 2:
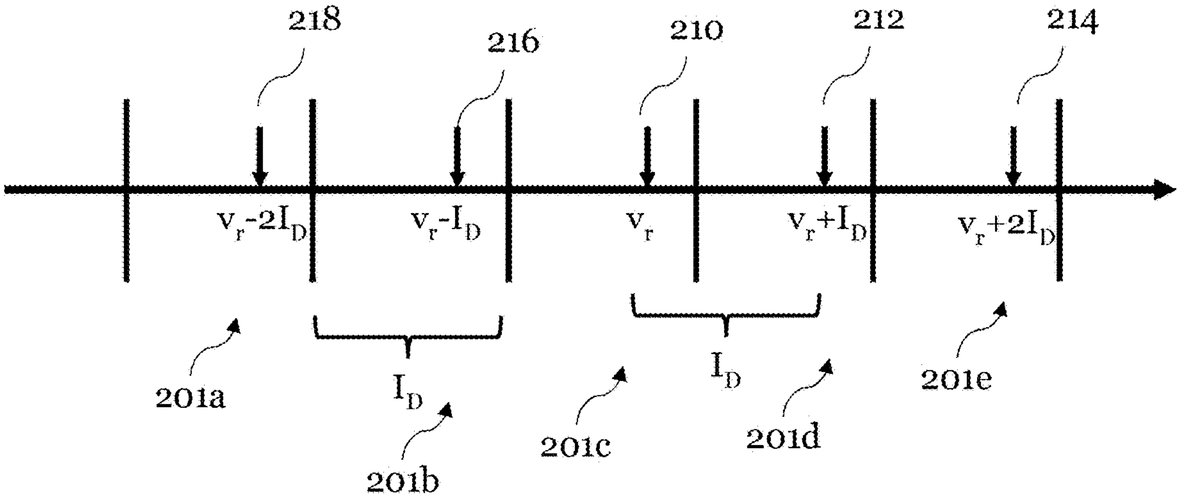
FIG. 2 illustrates mapped measured radial velocities of an object mapped to a plurality of intervals.
Figure 3:
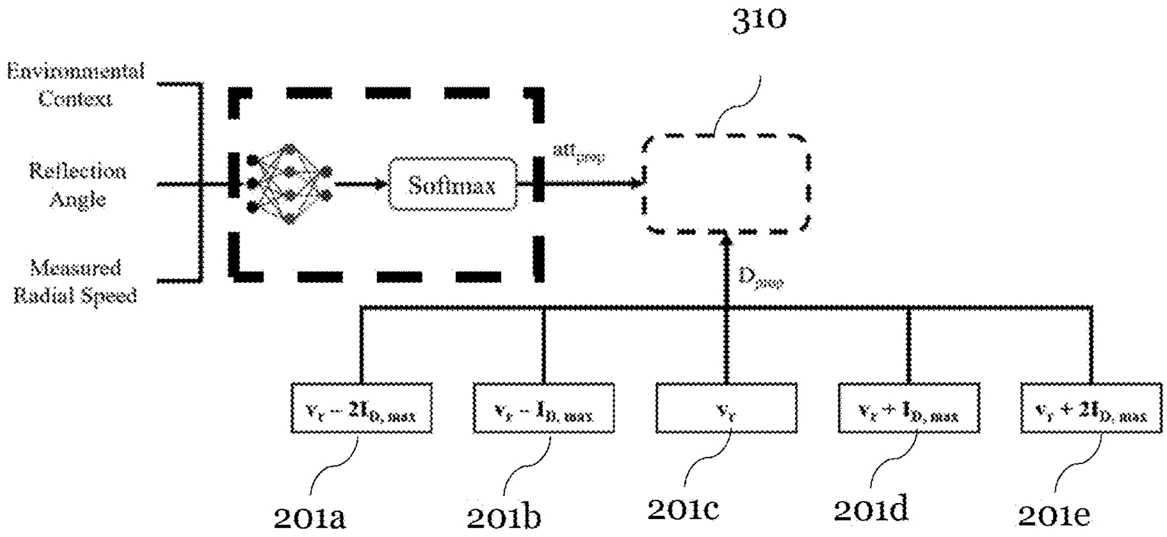
FIG. 3 illustrates a flow chart of a method for disambiguating radial velocity measurements.

Referring to FIGS. 2 and 3, an exemplary method for disambiguating the ambiguous measured radial velocity from radar measurement data is shown. As described above, from the radar, a measured radial velocity of the object is provided/obtained. While this measured radial velocity may resemble a value within the unambiguous interval of the radar, this radial velocity value may not be the actual radial velocity of the object, but an ambiguous radial velocity in an area outside the unambiguous interval.

In a first step of the disambiguation method, the measured radial velocity of the object may be mapped, as shown in FIG. 2. From the measured radial velocity potential radial velocities 210, 212, 214, 216, 218 that may cause the measured radial velocity waveform (when violation of the Nyquist-Shannon theorem is assumed) are mapped in the frequency domain and mapped to the unambiguous interval 201*c* and one or more ambiguous intervals 201*a*, 201*b*, 201*d*, 201*e*. Since, in the case of an FMCW radar, the radial velocities are determined by the phase shift of the transmitted radar signal, the potential radial velocities correspond to the measured radial velocity shifted by multiples of the interval. For example, a measured radial velocity of $v_r$ results in multiple potential measured radial velocities of $v_r$, $v_r+I_D$, $v_r+2I_D$, $v_r-I_D$ and $v_r-2I_D$ In this example, only two intervals 201*d*, 201*e* above and two intervals 201*a*, 201*b* below the unambiguous interval 201*c* are considered. However, the number of intervals may be changed based on the application. From the potential measured radial velocities, one potential measured radial velocity corresponds to the actual radial velocity of the object. Similarly, one of the intervals 201*a*, 201*b*, 201*c*, 201*d*, 201*e* corresponds to the radial velocity range in which the object is moving. Disambiguating the interval allows to determine subsequent radial velocities more effective, as it is likely that the measured radial velocity is still allocated in (or at least close to) the previous interval.

To determine which of the intervals (i.e., the measured radial velocity) is most likely the interval comprising the actual radial velocity of the object, a radial velocity of the object is estimated.

In FIG. 3, a disambiguation module (Doppler disambiguation module) 310 for defining the interval that has the highest probability of comprising the actual radial velocity of the object is illustrated. The disambiguation module 310 obtains the (unfolded) intervals 201*a*, 201*b*, 201*c*, 201*d*, 201*e* (also denoted as $D_{prop}$) obtained in the previous step as well as probability values $att_{prop}$ for each proposal to be the actual radial velocity of the object.

While the term "highest probability" is used in this context, performing a weighted sum between Doppler proposals and the probability values $att_{prop}$ may be sufficient to reliably determine the actual radial velocity of the object.

The probability values $att_{prop}$ may be determined by means of an AI engine. For example, neural network layers within the AI engine may be used to determine/predict $att_{prop}$. In an AI-based (machine learning) approach, $att_{prop}$ may be determined/predicted as a function using dense DL-layers of supplemental measurement data, such as environmental context, the reflection angle of the object and the measured radial velocity of each detection. The reflection angle of the object relates to the angle at which the radar signal is reflected back from the object to the radar. The environmental context describes feature encodings that may be extracted by the neural network based on the radar input data. The environmental context may be obtained from an output of a Recurrent Neural Network (RNN) module (described in more detail with reference to FIG. 5 below). These outputs contain encodings that could be used to extract a velocity estimate of the object (by incorporating the reflection angle information related to the object, the radial velocity can be obtained). Exemplary machine learning methods for the above engine may be soft attention (softmax or temperature-softmax interval probabilities) and/or hard attention.

While the estimated radial velocity of the object may only be a rough estimate, it is well below the potential error caused by the ambiguously measured radial velocity values. Thus, in a next step, the estimated measured radial velocity 420 is mapped to a corresponding interval of the plurality of intervals and the distance between the mapped potential measured radial velocity values mapped to the individual intervals are measured. The respective distances obtained this way are then utilized within the disambiguation module to determine/predict probabilities for the intervals each detection belongs to.

Figure 4:
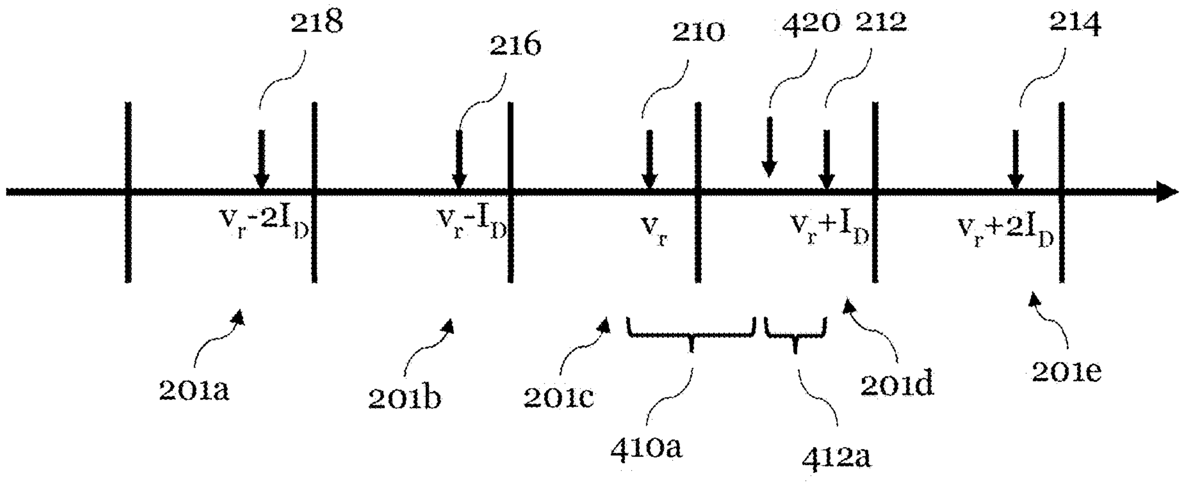
FIG. 4 illustrates mapped measured radial velocities of an object mapped to the plurality of intervals and an estimated velocity of the object.

In the example shown in FIG. 4, the estimated measured radial velocity corresponds to the interval 201*d*, including the (potential) measured radial velocity value $v_r+I_D$. In this case, the distance between $v_r+I_D$ and the estimated radial velocity of the object 412*a* has the smallest difference with respect to the other mapped radial velocities. Accordingly, the interval 201*d* including the measured radial velocity value $v_r+I_D$ will be assigned the highest probability of comprising the actual radial velocity of the object. Since in this example the potential measured radial velocity value included in the unambiguous interval 201*c* has the second smallest difference to the estimated radial velocity of the object 410*a*, the unambiguous interval 201*c* will also be provided with a relatively high probability of comprising the actual radial velocity of the object, but smaller than the probability associated with the interval including the measured radial velocity value $v_r+I_D$. Each of the intervals 201*a-e* may obtain a probability value this way.

With this information, the most probable interval will be selected and the (potential) measured radial velocity in this interval will be considered as the actual radial velocity of the object. According to this approach, the benefits of estimating the radial velocity and determining the radial velocity precisely by means of a radar are combined and the negative effects mentioned above are avoided.

Figure 5:
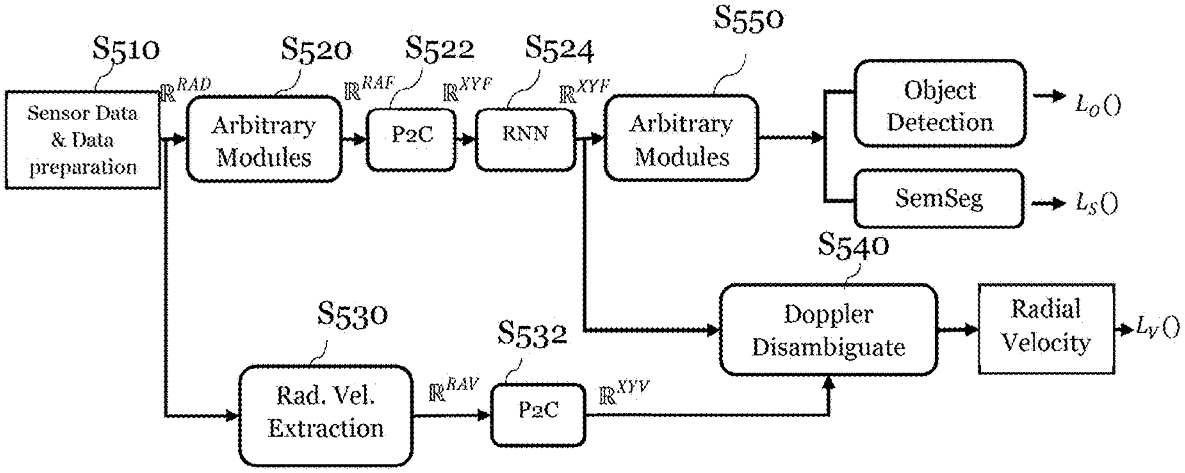
FIG. 5 illustrates a flow chart of an exemplary implementation of the method for determining the actual radial velocity of an object based on a radar measurement.

Exemplary Implementation of the Method for Determining the Radial Velocity of an Object In FIG. 5, an implementation example of the above-described method is shown. For example, such an implementation may be included in a radar-based system of an ADAS.

In step S510, according to this exemplary implementation, the measurement data (radar data) is obtained from the radar. The measurement data comprises a signal indicative of a measured radial velocity of the object, which corresponds to the actual radial velocity of the object and/or to the ambiguous radial velocity outside the unambiguous interval of the radar. The actual radial velocity and the radial velocities outside the unambiguous interval of the radar are considered the potential radial velocities of the object. The measurement data may be provided in a data cube comprising range, angle, and azimuth information. In the following, the focus will be on the radial velocity of the object. However, the skilled person understands that the radial velocity may be associated with further range and angle information.

In step S520, the measurement data may then be processed by neural network layers to extract spatial local correlation within the radar data. Afterwards, this data may then be transformed into a cartesian system comprising X×Y grid cells (Step S522). While transforming the radar data into cartesian grid cells is generally preferred, the transformation step may also be omitted, and the measurement data may further be processed in the range-azimuth-Doppler-(RAD)-dimension. After the (optional) transformation of the measurement data, the data may then be processed by a RNN for aggregation and to extract temporal patterns within the data across consecutive frames (Step S524). The processed data may provide the environmental context of the object, which may include or may be used to obtain the estimated radial velocity. The environmental context may comprise information on the object. For example, the environmental context may comprise information that is characteristic for the object, preferably one or more of the radial velocity of the object determined at a previous point in time, a most probable interval determined at a previous point in time, a correlation between a location of the object in relation to the vehicle and/or a determination of the type of object and preferably a predetermined radial velocity to be expected for that type of object. For example, if it was determined during a previous radial velocity in a measurement interval before the current measurement that the actual radial velocity is likely in the interval comprising the measured radial velocity of $v_r+I_D$, it is likely that the current measured radial velocity is also in this interval. In another example, it may be determined that the object is likely a tree or a vehicle and a typical estimated radial velocity may be associated with the respective object. Moreover, information on the surrounding may also be obtained and considered for estimating the radial velocity. For example, information on the surrounding may include determining that an area of the surrounding is a road or that an area of the surrounding is a building and estimate radial velocities of objects in the corresponding areas.

In parallel to steps S520 to S524, in step S530, the radial velocity information of the measurement data is extracted, and the unfolded intervals are obtained. Similar to above, the radial velocity information is provided in the RAD dimension, initially. Thus, in Step S532, the RAD dimensional data may be transformed into cartesian X×Y grid cells.

As described above, the measured radar data may comprise the ambiguous potential measured radial velocities due to the radial velocity of the object being outside of the unambiguous interval of the radar. Thus, in step S540, the disambiguation module is used to disambiguate the Doppler velocity information and obtain/determine the actual radial velocity of the object, as described above.

Furthermore, in step S550, the information and/or the resulting feature maps obtained by the RNN in step 530 may be processed by further external modules, for example by an object detection or grid segmentation module (S250) for use in the ADAS.

For example, based on the object detection, the grid segmentation and/or the radial velocity determination of the object, the ADAS may display the object and preferably also the velocity of the object on a display of the vehicle to a user, conduct a vehicle path planning, triggering a warning to the user and/or affect the control of the vehicle during operation, preferably in a parking process.

While the above method was mainly described with reference to a FMCW radar, other radar sensors and technologies are also possible.

Moreover, the above-described method may be implemented in an apparatus, which may be comprised by a vehicle. The above method may also be implemented in the form of a computer program. That is, a computer program may comprise instructions, which when executed by a computing system cause the system to perform the above-described method.

Exemplary Application of the Method Using a Machine Learning Algorithm

Figure 6:
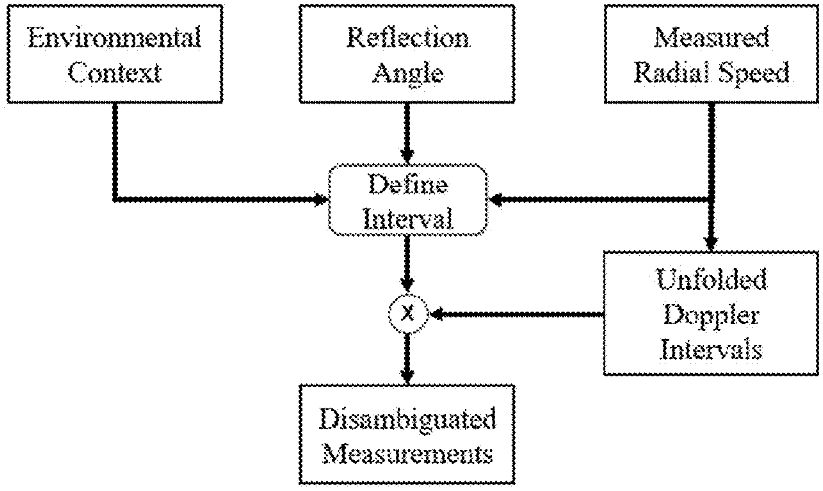
FIG. 6 illustrates an exemplary implementation of the method using a machine learning algorithm.

The basic functionality of this module is depicted in FIG. 6. Doppler velocity measurements $v_r$ of radar data located in a grid map are unfolded. Various methods like soft attention (softmax or temperature-softmax interval probabilities), hard attention, etc. may be utilized to determine probabilities attprop and define resulting radial velocities.

Neural network layers within "Define Interval", as shown in FIG. 6, then determine/predict probabilities attprop for each proposed interval to comprise the true radial velocity of the object. This determination/prediction may be designed as a function utilizing dense DL-layers of the environmental context, the reflection angle and the initially radial velocity measurement. The environmental context describes feature encodings that are extracted by a neural network based on the radar data. The environmental context may stem from the output of a Recurrent Neural Network (RNN) module. These outputs contain encodings that may be used to extract velocity estimates of captured objects with a weak accuracy compared to unambiguous radar velocity measurements. However, it can be assumed that the error of these velocity estimates remains well below the potential error of ambiguous radar velocity measurements which is determined by a multitude of the span of one interval of the plurality of intervals. The discrepancy between velocities with a consistently poor accuracy estimate based on environmental context and highly accurate radial velocity measurements from the radar sensor with an alternating error which potentially is magnitudes higher due to aliasing effects.

As velocity estimates from environmental context don't necessary relate to radial velocity components, operations like neural network layers within "Define Interval", as shown in FIG. 5, may interpret relationships between total velocities and their corresponding radial velocity components. For this, the model may use the reflection angles under which objects were detected related to the longitudinal axis of the host vehicle for disambiguation.

Finally, the actually measured radial velocity is incorporated to calculate the discrepancy to radial velocities estimated by the model based on environmental context and reflection angles. This discrepancy can then be utilized within "Define Interval" to determine/predict probabilities of intervals each detection belongs to. That discrepancy can then be utilized by the neural network layers to determine the shift each radial velocity measurement needs to be projected by for disambiguation.

Training and Inference of the Artificial Intelligence Engine

During Training, class probabilities $att_{prop}$ of each potential measured radial velocity belonging to one of $n_{prop}$ intervals of the plurality of intervals that are determined/predicted by consecutive neural network layers based on aforementioned input features environmental context, reflection angle and measured radial speed are propagated as shown in FIG. 3.

For Ground Truth (GT), the radial velocities of objects are calculated from total velocities that are projected to the radial axis for each radar sensor mounted on the host vehicle as varying mounting positions result in varying radial velocities for the same absolute target position a radial velocity measurement was obtained from. Within the loss function, in FIG. 7 a classification loss function ("Classification") is shown as an exemplary loss function the right radial velocity GT for each detection is then extracted based on the knowledge about the radar sensor obtaining this detection. Resulting radial velocity scalar values are then transferred to the corresponding Doppler intervals. Finally, in the example of the classification loss function, a cross entropy loss function determines the error between determined/predicted Doppler bin probabilities for measured radial velocities vr and the Doppler bin each radial velocity in the GT is assigned to.

Figure 7:
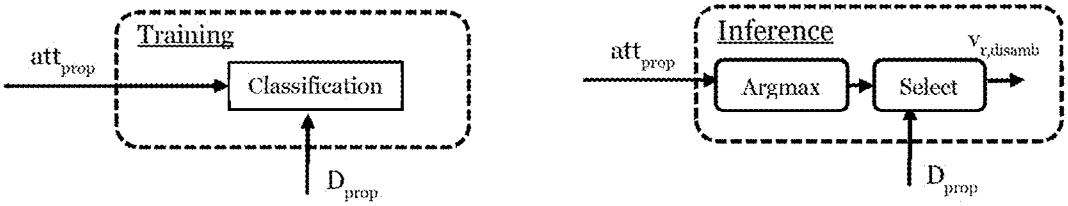
FIG. 7 illustrates the training and inference of an exemplary artificial intelligence engine application of the method for determining the radial velocity of an object.

While FIG. 7 shows the classification loss function as an example, other loss functions may also be used. For example, approaches based on soft attenuation or hard attenuation may also be used and employed accordingly.

During inference, the module then extracts the interval $n_{prop}$ with the highest responding value across all probabilities $att_{prop}$ and shifts $v_r$ by the corresponding offsets. That is, if it is determined that the interval including the (potential) measured radial velocity $v_r+2I_D$ has the highest probability, the measured radial velocity is shifted by $2I_D$ to obtain the actual radial velocity of the object.

In other examples, during inference, a weighted sum between Doppler proposals and probabilities $att_{prop}$ may be performed to determine the actual radial velocity of the object By applying the above method in an ADAS, the ADAS may perform the determination of the radial velocity of on object in its surrounding, as described above. Accordingly, the vehicle assistance system may trigger one or more actions. Such actions may be any action performed by ADAS, in particular, in view of the determined radial velocity. That is, the ADAS may determine an operating instruction for the vehicle based on the determined radial velocity of the object, affecting the function of the ADAS such as one or more of: displaying the object and preferably also the velocity of the object on a display of the vehicle; conducting a vehicle path planning; triggering a warning; affecting control of the vehicle during a parking process and/or during driving.

Figure 8:
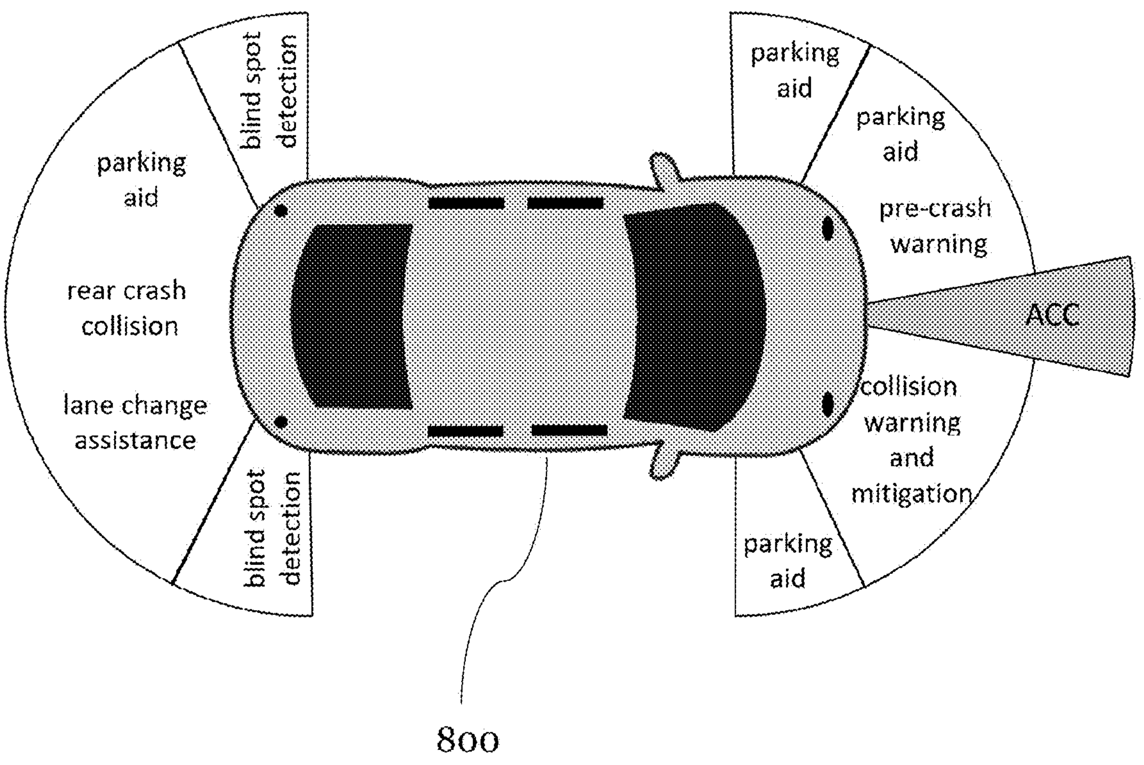
FIG. 8 illustrates a vehicle according to aspects of the present invention.

An example vehicle 800 comprising an ADAS as mentioned above, and corresponding applications are depicted in FIG. 8. In this example, the vehicle 800 is a car. However, in other examples, the vehicle 800 may be any one of a ship, a drone, a robot or other vehicles that may benefit from considering the environment in their respective actions/operations.

In an example, the ADAS may be configured to execute the method described above. For example, the ADAS may consider the information obtained by the above method, for example by means of the radar, such as the determined radial velocity of the objects, to control the vehicle. One exemplary application is an adaptive cruise control (ACC) function for the vehicle, for example, for a robot in a manufacturing plant such that collisions with other robots or persons are avoided. Furthermore, the vehicle 800 may comprise a collision warning or mitigation feature that may benefit from the above-described methods. Another potential application for the above is a pre-crash warning. This may be particularly critical in a vehicle such as a car, for example in a traffic accident situation where the pre-crash warning may trigger security relevant applications such as an airbag to avoid harm to the driver. Similarly, a rear crash collision avoidance could be implemented. Moreover, another potential application is to aid a driver of a car in a parking operation. For this, the information obtained may be used for blind spot detection or as a general parking aid, to facilitate the parking. Moreover, the information may also be used to assist a driver in changing the lane by triggering a warning, if an object is detected that may be accidentally hit during a lane change. This may also be used for realizing fully automatic lane changes.

The method according to the present invention may be implemented in terms of a computer program which may be executed on any suitable data processing device comprising means (e.g., a memory and one or more processors operatively coupled to the memory) being configured accordingly. The computer program may be stored as computer-executable instructions on a non-transitory computer-readable medium.

Embodiments of the present disclosure may be realized in any of various forms. For example, in some embodiments, the present invention may be realized as a computer-implemented method, a computer-readable memory medium, or a computer system.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer-implemented method for determining a radial velocity of an object in a surrounding of a vehicle, the method comprising:

obtaining measurement data from a radar, the measurement data comprising signal data indicative of a measured radial velocity of the object;

mapping the measured radial velocity of the object to a plurality of radial velocity intervals by generating a plurality of potential radial velocities based on the measured radial velocity, each potential radial velocity being associated with a respective interval of the plurality of radial velocity intervals, wherein each potential radial velocity represents a candidate for an actual radial velocity of the object;

determining, using an artificial intelligence, (AI) engine, a probability value for each interval of the plurality of radial velocity intervals based on supplemental measurement data derived from the measurement data;

determining the radial velocity of the object by selecting the interval of the plurality of radial velocity intervals based on the probability value having a highest probability value, and defining the potential radial velocity mapped to the selected interval as the radial velocity of the object; and determining, based on the determined radial velocity of the object, an operating instruction for the vehicle affecting a function of a vehicle assistance system, the function comprising at least one of: displaying the object on a display of the vehicle, conducting a vehicle path planning, triggering a warning, or affecting control of the vehicle during a parking process or during driving; and controlling the vehicle to perform the determined operating instruction.

2. The method according to claim 1, wherein selecting the interval further comprising:

estimating a radial velocity value of the object based on the supplemental measurement data, wherein the supplemental measurement data is derived from the measurement data; and using the estimated radial velocity value to derive the probability value assigned to each interval of the plurality of radial velocity intervals.

3. The method according to claim 1, further comprising:

generating the plurality of radial velocity intervals by shifting one unambiguous radial velocity interval to form at least one ambiguous radial velocity interval;

wherein each mapped measured radial velocity interval represents a potential radial velocity of the object.

4. The method according to claim 2, further comprising:

deriving the probability value assigned to each interval based on a difference between the plurality of potential radial velocities and the estimated radial velocity value.

5. The method according to claim 4, wherein a smallest difference between the potential measured radial velocity and the estimated radial velocity values corresponds to the highest probability value.

6. The method according to claim 1, wherein the intervals are allocated adjacent to each other in a Doppler velocity dimension.

7. The method according to claim 1, wherein the intervals have a common width in a Doppler velocity dimension, the common width being determined by characteristics of the radar.

8. The method according to claim 1, wherein the AI engine is trained by mapping feature embeddings of environmental context data, reflection angle data and measured radial velocities to the probability values assigned to each interval of the plurality of radial velocity intervals.

9. An apparatus comprising a processor and a memory operatively coupled to the processor, the memory storing instructions that, when executed by the processor, cause the apparatus to perform the method of claim 1.

10. A vehicle comprising a radar and an apparatus according to claim 9.

11. A non-transitory computer readable medium storing computer executable instructions, which, when executed by a computing system, cause the computing system to perform the method of claim 1.

* * * * *